UNITED STATES PATENT OFFICE.

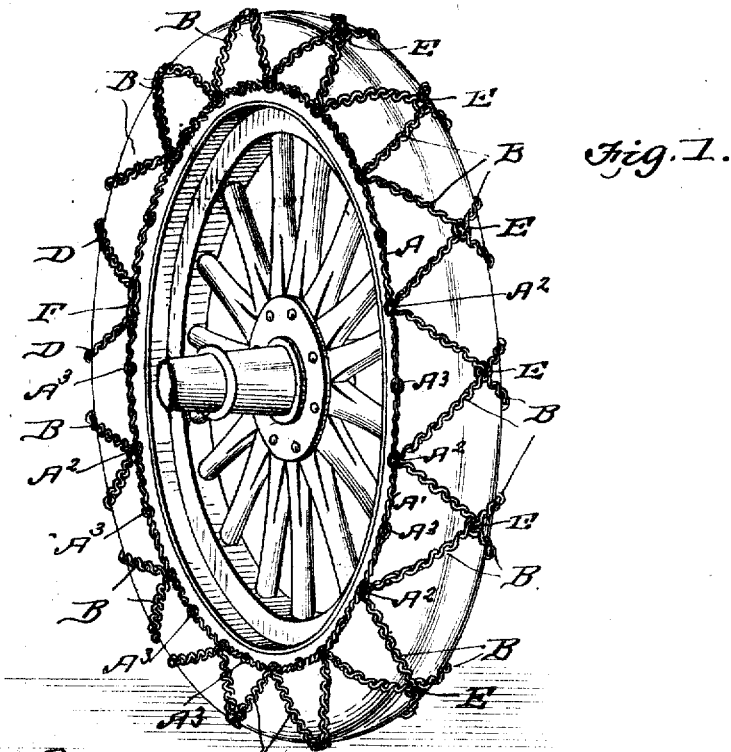
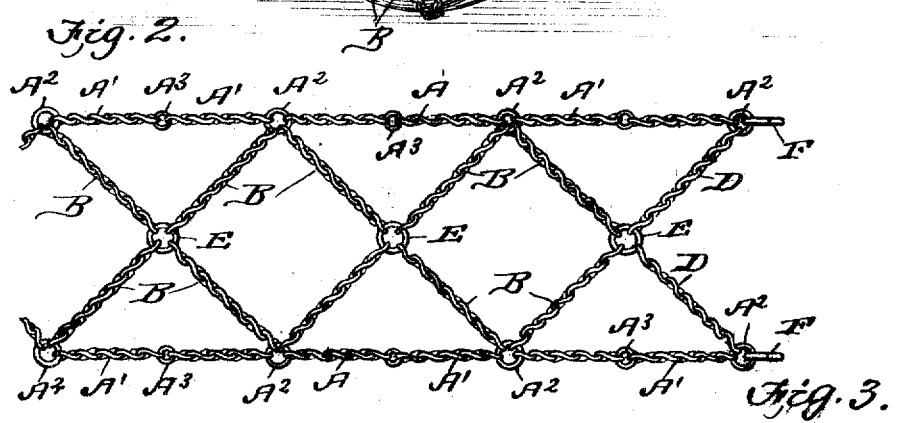
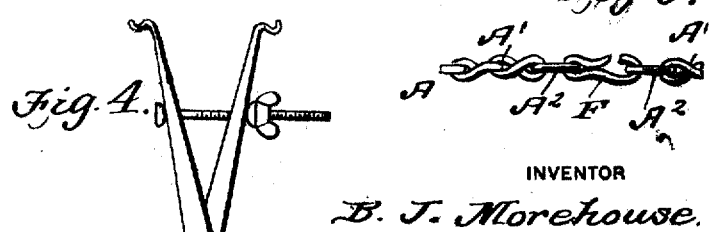

BURKE JUDSON MOREHOUSE, OF GRANVILLE, NEW YORK, ASSIGNOR TO GRENVILLE C. WALKER, OF GRANVILLE, NEW YORK.

CHAIN MAT FOR WHEEL-TIRES.

No. 911,427.  Specification of Letters Patent.  Patented Feb. 2, 1909.

Application filed February 13, 1906. Serial No. 300,868.

*To all whom it may concern:*

Be it known that I, BURKE JUDSON MOREHOUSE, a citizen of the United States, residing at Granville, in the county of Washington and State of New York, have invented a new and useful Improvement in Chain Mats for Wheel-Tires, of which the following is a specification.

This invention relates to an improved tread-mat or antislipping device for pneumatic or cushioned-tired vehicle-wheels, and has for its objects to provide a cheap, simple, durable, and efficient device that may be readily attached to or detached from a tire.

A further object of the invention is to provide a device that will not become disengaged through constant use and one which will not become easily tangled when being applied to a wheel.

Still a further object of the invention is to provide a mat which will not slip circumferentially upon the wheel, and one in which the parts composing the mat will extend diagonally across the tread from the central portion thereof, thereby preventing the said parts turning or twisting when brought into engagement with the roadway.

With these briefly stated objects in view, the invention comprises two parallel arranged chain members each having at certain intervals throughout their length, enlarged links, to each of which is connected chain sections, which extend in diverging directions over and around the tread surface of the tire, said chain sections being connected at their opposite ends by rings which lie centrally against the tread of the wheel, and provide a firm connection at the points of intersection of the chain sections.

The invention also comprises certain details of construction which render the mat capable of ready attachment to a tire, and also certain other details and peculiar combination and arrangement of parts as will be fully set forth in the following specification and pointed out in the claim, reference being had to the drawings, in which, Figure 1 is a positive view of a pneumatic tire-wheel having my improvement applied. Fig. 2 is a detail plan view of a section of the mat. Fig. 3 is an enlarged detail view showing the ends of one of the parallel members connected, and Fig. 4 is a detail view of a tool for applying the mat to a wheel.

In constructing a device in accordance with my invention I employ a series of chains which are connected to form a mat that extends over and entirely around the periphery of the rim of the wheel, and by reference particularly to Fig. 2 of the drawing, it will be seen, I employ two parallel arranged chain members A, that extend entirely around and rest against the side of the cushion tire. The said members are constructed of twisted link sections A', which are united by circular or oval shaped links A², and A³, which are arranged at certain intervals throughout the entire length of each member and at the ends thereof. In practice the links A², are preferably of a larger diameter than the links A³. To each intermediate link A², is connected two twisted link chain sections B which extend in diverging directions toward the opposite member A, and have their inner ends connected to rings E, thereby producing substantially rectangular shaped figures throughout the entire length of the mat. To each end link A² is connected a single chain section D, whose opposite ends are connected to one of the rings E, so that when the ends of the parallel members are connected, the rectangular shaped figures will extend throughout the entire length of the mat. In order to connect the ends of the parallel arranged members, I provide the links at one end with hooks F, of any suitable construction which are designed to be caught into the links at the opposite ends.

When my device is attached to the rim of a wheel, the parallel members lie against the side of the tire and adjacent the rim of the wheel, and the twisted link sections B, will extend diagonally across the tire with the rings E, resting upon the central portion of the tread as shown most clearly in Fig. 1 of the drawing, and by this arrangement, it will be clearly seen that the chain sections extend over the entire periphery of the tire in zig-zag directions from the rings E, which lie against and at the center of the tread portion so that a firm grip upon the road may be had and the mat prevented from slipping no matter in which direction the wheels may be revolved.

In order to facilitate the attachment of the mat, I employ a tool constructed like a pair of calipers, and having the free ends of the arms bent to provide hooks and the arms connected by a threaded bolt upon which operates a thumb-screw for drawing the arms together. With this tool, the ends of the parallel members may be drawn together by inserting the hooked ends into the end links and screwing up the nut to force the arms together when the hooks F, may be readily caught into the links at the opposite ends of the members.

As shown in the drawings, the short chain sections are connected to the large straight links of the side members, leaving the smaller straight links in the members connected only with the twisted links of the members. This idea is for the purpose of preventing or decreasing the tendency of the twisted sections buckling or kinking while the mat is being applied to a wheel, as it is understood that these straight links will allow a certain amount of revolvatory movement that would not otherwise be had, should each section between the larger links be one of continuous twisted links.

In practice when the mat is applied to a wheel, the ends of one of the parallel members are connected, the mat is then adjusted over the tire and then by the use of the tool, the ends of the opposite member are drawn together and connected which operation is exceedingly simple and requires but a short time to adjust the mats in place.

From the foregoing, it will be seen I provide an exceedingly cheap, simple, and highly efficient device for the purpose stated.

Having thus fully described my invention, what I claim as new and desire to secure by Letters Patent is:—

A tread mat for tires comprising parallel arranged members each consisting of twisted link sections having straight links interposed throughout their length and at the ends thereof, hooks carried by one of the straight links of each member and adapted for engagement with the straight links at the opposite ends of each member, two chain sections of twisted links connected to each alternate straight link, and chain sections of twisted links connected to the straight links at the ends of each parallel arranged member, said chain sections extending in an oblique direction toward the opposite parallel member, and rings connecting the opposite meeting ends of the sections substantially as shown and described.

BURKE JUDSON MOREHOUSE.

Witnesses:
G. N. HULL,
H. J. STEVENS.